(12) United States Patent
Wang et al.

(10) Patent No.: US 12,197,370 B2
(45) Date of Patent: Jan. 14, 2025

(54) CONFIGURATION OF SLAVE DEVICES IN AN INDUSTRIAL NETWORK SYSTEM

(71) Applicant: Schneider Electric Industries SAS, Rueil Malmaison (FR)

(72) Inventors: Caijin Wang, Singapore (SG); Ashwani Singh, L'Isle d'Espagnac (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 167 days.

(21) Appl. No.: 17/969,750

(22) Filed: Oct. 20, 2022

(65) Prior Publication Data

US 2023/0131136 A1 Apr. 27, 2023

(30) Foreign Application Priority Data

Oct. 27, 2021 (EP) ..................................... 21306503

(51) Int. Cl.
*G06F 13/38* (2006.01)

(52) U.S. Cl.
CPC .................................. *G06F 13/387* (2013.01)

(58) Field of Classification Search
CPC ..................................................... G06F 13/387
See application file for complete search history.

(56) References Cited

U.S. PATENT DOCUMENTS

| 2010/0131620 | A1* | 5/2010 | Kondamuru | .......... | G06F 9/5083 |
| | | | | | 709/226 |
| 2012/0023277 | A1* | 1/2012 | Graf | ..................... | G05B 19/054 |
| | | | | | 710/110 |

(Continued)

OTHER PUBLICATIONS

European Search Report and Search Opinion dated Mar. 30, 2022 for corresponding European Patent Application No. EP21306503.0, 10 Pages.

*Primary Examiner* — Eric T Oberly
(74) *Attorney, Agent, or Firm* — Locke Lord LLP (57) ABSTRACT

A method for configuring slave devices in a communication system including a master device and slave devices, wherein the master device and the slave devices are connected in chain via a commission line and in parallel via a field bus line, and wherein each slave device is indexed by an index greater than or equal to 1, the slave device of index 1 being connected to the master device. To enroll the slave device of index k, k being equal to or greater than 1, the master device is able to: send, in broadcast via the field bus line, an address configuration frame containing instructions for address configuration with a defined address of index k for the slave device of index k; send, in broadcast via the field bus line, a request for device information, the request containing the defined address; send, in broadcast via the field bus line after having received a reply containing device information and the defined address, a command for sending a commissioning signal via the commission line to the slave device of index k+1, the command containing the defined address; and store the received device information in an information table, the device information containing an identifier of the slave device of index k and a type of the slave device of index k, wherein the slave devices have a common default address before being enrolled and only a slave device of index k, which has the common default address and detects a commissioning signal on the commission line, accepts the address configuration frame to change the common default address of the slave device of index k to the defined address.

13 Claims, 2 Drawing Sheets

(56) References Cited

U.S. PATENT DOCUMENTS

| | | |
|---|---|---|
| 2016/0103773 A1 | 4/2016 | Sauer et al. |
| 2017/0046292 A1 | 2/2017 | Teuke |
| 2018/0227214 A1* | 8/2018 | Huang .................... H04L 67/10 |
| 2020/0252237 A1 | 8/2020 | Goldberg |
| 2022/0050799 A1* | 2/2022 | Fessel ............... H04L 12/40013 |

* cited by examiner

CONFIGURATION OF SLAVE DEVICES IN AN INDUSTRIAL NETWORK SYSTEM

FIELD OF INVENTION

The present invention relates to network systems comprising serial bus slave devices controlled by a master device. In particular, it concerns configuration of the slave devices during a configuration phase, such as during start-up of the network system for example.

BACKGROUND

In wired communication networks, there is a need to assign addresses to slave devices (or nodes) that are present/added in the network. This can be performed manually but this solution is long, prone to input errors and requires expertise by the operator manually addressing the slave devices.

Such communication network may form a wireless gateway device managing different wireless modules as slave devices implementing mixed critical applications using various wireless radio protocols integrated in modular way within the same gateway device. These wireless modules can use with Zigbee, Bluetooth and IO Link Wireless based Industrial IoT (Internet of Things), Industrial control applications but can be used for other applications too.

There is therefore a need to scale up or down the deployment of slave devices in communication system for an industry 4.0 application in a flexible, plug and play manner.

SUMMARY

This summary is provided to introduce concepts related to the present inventive subject matter. This summary is not intended to identify essential features of the claimed subject matter nor is it intended for use in determining or limiting the scope of the claimed subject matter.

In one implementation, there is provided a method for configuring slave devices in a communication system comprising a master device and slave devices, wherein the master device and the slave devices are connected in chain via a commission line and in parallel via a field bus line, wherein each slave device is indexed by an index greater than or equal to 1, the slave device of index 1 being connected to the master device, wherein, to enroll the slave device of index k, k being equal to or greater than 1, the method comprises the following operations performed by the master device:

sending, in broadcast via the field bus line, an address configuration frame containing instructions for address configuration with a defined address of index k for the slave device of index k, sending, in broadcast via the field bus line, a request for device information, the request containing the defined address, sending, in broadcast via the field bus line after having received a reply containing device information and the defined address, a command for sending a commissioning signal via the commission line to the slave device of index k+1, the command containing the defined address, storing the received device information in an information table, the device information containing an identifier of the slave device of index k and a type of the slave device of index k, wherein the slave devices have a common default address before being enrolled and only a slave device of index k, which has the common default address and detects a commissioning signal on the commission line, accepts the address configuration frame to change the common default address of the slave device of index k to the defined address.

Advantageously, as the slave devices are connected in chain via a commission line, the slave devices are enrolled one by one, the enrollment of each slave device being triggered by the reception of a commissioning signal on the commission line from a previous slave device in the chain that has been enrolled. All the slave devices are plug and play without any manual configurations.

Advantageously, the method allows to scale up or down the deployment of wireless sensor or control devices as slave devices for an industry 4.0 application (e.g. Digital Plant) in a flexible, plug and play manner.

In an embodiment, to enroll the slave device of index 1, the master device sends a commissioning signal on the commission line to the slave device of index 1 before sending, in broadcast via the field bus line, an address configuration frame.

In an embodiment, the master device receives an acknowledgement frame, the acknowledgement frame containing the defined address before sending, a request for device information, the request containing the defined address.

In an embodiment, the enrollment of slave devices is terminated when the master device does not receive an acknowledgement frame containing a defined address from a slave device.

In an embodiment, a start-up of the communication system to address the slave device of index k, the master device sends, in broadcast via the field bus line, an address configuration frame containing instructions for address configuration with the defined address of index k and the identifier of the slave device of index k.

In an embodiment, a start-up of the communication system, the slave devices have a common default address, and the slave device of index k receiving the address configuration frame accepts the address configuration frame to change the common default address of the slave device of index k to the defined address.

In an embodiment, wherein the master device identifies a slave device of index k as a faulty device if the master device does not receive an acknowledgement frame containing the defined address after having sent the address configuration frame containing instructions for address configuration with the defined address of index k and the identifier of the slave device of index k.

In an embodiment, the master device compares, for each slave device, a signature of configuration data stored in the slave device with a signature of configuration data stored in the master device, in order to synchronize the configuration data stored in the slave device with the configuration data stored in the master device if the signatures are different.

In an embodiment, when a new slave device of index n+1 is placed in the communication system during run time, wherein the new slave device is connected to the last slave device of index k, with k equal to n, of the communication system, the master device starts an enrollment process by sending, in broadcast on the field bus line, a command for enabling the commission line in order that each slave device of index k, previously enrolled, sends a commissioning signal on the commission line to the next slave device of index k+1, and the master device performs the steps of sending an address configuration frame with defined address of index n+1, sending a request for device information with defined address of index n+1, sending a command with defined address of index n+1 and storing the received device information.

In an embodiment, when a new slave device replaces a faulty slave device, a replacement enrollment is triggered in the master device that performs the steps of sending (S2) an address configuration frame, sending (S3) a request for device information, sending (S4) a command and storing (S5) the received device information, and wherein the master device detects that a new slave device has replaced the faulty slave device, by means of the information table, the identifier of the new slave device and the identifier of the faulty slave device.

In an embodiment, when a new slave device replaces a faulty slave device, for which configuration data are stored in the master device in correspondence with an identifier of the faulty slave device and a type of the faulty slave device, the master device restores the configuration data for the new slave device by means of the configuration data of the faulty device, if the new slave device and the faulty slave device are of the same type.

Advantageously, the continuity of operation is guaranteed even if one slave device, like a wireless module, fails and replacement of the faulty slave device is made effortless for the customers through automatic synchronization and configuration restore.

In another implementation, there is provided a master device for configuring slave devices in a communication system comprising the master device and slave devices, wherein the master device and the slave devices are connected in chain via a commission line and in parallel via a field bus line, wherein each slave device is indexed by an index greater than or equal to 1, the slave device of index 1 being connected to the master device, wherein, to enroll the slave device of index k, k being equal to or greater than 1, the master device comprising:
- one or more network interfaces to communicate with the slave devices;
- a processor coupled to the network interfaces and configured to execute one or more processes; and
- a memory configured to store a process executable by the processor, the process when executed operable to:
- send, in broadcast via the field bus line, an address configuration frame containing instructions for address configuration with a defined address of index k for the slave device of index k,
- send, in broadcast via the field bus line, a request for device information, the request containing the defined address,
- send, in broadcast via the field bus line after having received a reply containing device information and the defined address, a command for sending a commissioning signal via the commission line to the slave device of index k+1, the command containing the defined address,
- store the received device information in an information table, the device information containing an identifier of the slave device of index k and a type of the slave device of index k, wherein the slave devices have a common default address before being enrolled and only a slave device of index k, which has the common default address and detects a commissioning signal on the commission line, accepts the address configuration frame to change the common default address of the slave device of index k to the defined address.

In another implementation there is provided a computer-readable medium having embodied thereon a computer program for executing a method for configuring slave devices in a communication system comprising a master device and the slave devices. Said computer program comprises instructions which carry out steps according to the method according to the invention.

In another implementation there is provided a system comprising the master device and a plurality of slave devices connected in chain to the master device.

BRIEF DESCRIPTION OF THE FIGURES

The detailed description is described with reference to the accompanying figures. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

The same reference number represents the same element or the same type of element on all drawings.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
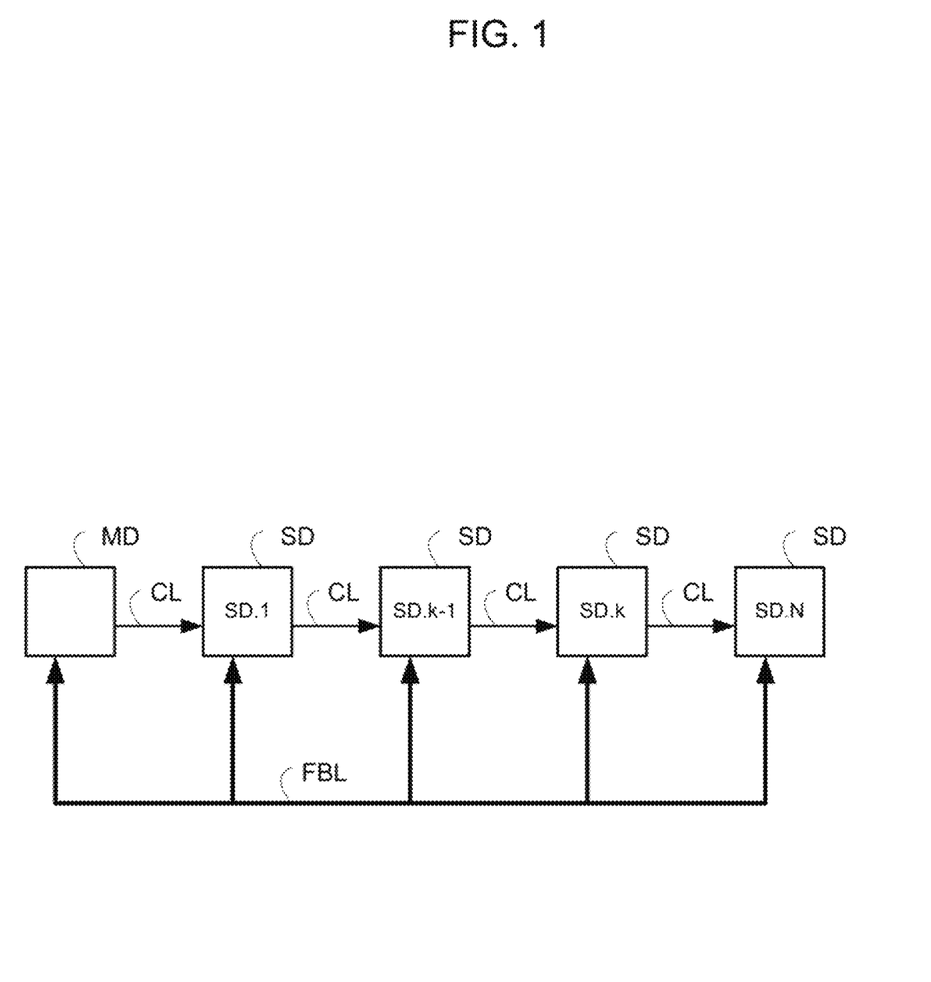
FIG. 1 shows a schematic block diagram of a communication system according to one embodiment of the invention for configuring slave devices in an industrial network system.

Referring to FIG. 1, a communication system comprises a master device MD and slave devices SD. The slave devices SD form a plurality of N slave devices SD (SD.1, SD.k−1, SD.k, . . . SD.N), N being an integer greater than or equal to 2, and k being an index varying between 1 and N. Each slave device is indexed by an index greater than or equal to 1, the slave device of index 1 being connected to the master device.

The master device MD is connected to the chain of slave devices SD via a commission line CL and a field bus line FBL. The slave devices SD are forming a "Daisy" chain via the commission line CL.

The commission line CL is a signaling unidirectional line carrying a commissioning signal. If a slave device SD detects a commissioning signal from the commission line CL and receives a commissioning request from the master device, the slave device SD enters in a commissioning state.

For example, the commissioning signal can be a clock signal, a code signal or any signal including a specific pattern. If the commissioning signal is a specific frequency clock signal, a slave device will enter in a commissioning state only if it receives a signal from the commission line CL including such specific frequency clock.

The field bus line FBL can be a half-duplex field bus, such as RS485 or I2C, for the communication between the master device MD and the slave devices SD.

A slave device SD is a communication module using an application, dedicated sensors and a communication protocol. In one embodiment, the slave devices SD are radio modules using Zigbee, Bluetooth, WiFi and IO Link Wireless based Industrial IoT (Internet of Things). The master device MD and the slave devices SD form a wireless gateway device managing mixed critical application using various wireless protocol radio integrated in modular way within the same gateway device. In one embodiment for industrial application, the slave devices SD are arranged in a stacked-up manner upon the master device, forming a wireless gateway system under the form of a column.

By default, all the slave devices may have initially a common default address, such as 0XFE for example.

The master device MD is able to trigger an enrollment process, executed during the commissioning of the installed slave devices, i.e. the wireless gateway commissioning. The enrollment process can enroll the slave devices in sequence and automatically stop when it finishes the enrollment of the last slave device in the system. The master device can then create an information table containing slave device information and save it into a local memory, like a NVM (Non Volatile Memory).

The master device MD is able to send a commissioning signal on the commission line CL at the start of the enrollment process. The commissioning signal is sent to the first slave device connected to the master device.

The master device MD is able to send an address configuration frame in broadcast on the field bus line FBL. The address configuration frame contains instructions for address configuration with a defined address for the slave device of index k.

Once the master device MD has received an acknowledgement for the defined address on the field bus line FBL from the slave device of index k, the master device MD is able to send a request for device information in broadcast on the field bus line FBL, the request containing the defined address. Only the slave device of index k having acknowledged the previous address configuration frame will process the request.

Once the master device MD has received device information on the field bus line FBL, the master device MD is able to send a command for enabling the commission line CL from the slave device of index k to the slave device of index k+1. The slave device of index k is then ready to send a commissioning signal on the commission line CL to the next slave device of index k+1.

The master device MD can then store device information of the slave device of index k in the information table. The device information contains for example a name of the slave device of index k, an identifier of the slave device of index k and a type of the slave device of index k. The identifier of the slave device can be a unique serial number that is saved into a memory of the slave device during production. The type of slave device can be a supporting function code that is saved into a memory of the slave device during production. The slave device with the same function or functions are designed to use the same type of slave device.

To continue the enrollment process, the master device MD is able to send in broadcast on the field bus line FBL an address configuration frame with a defined address for the slave device of index k+1, a request for device information, and then a command for enabling the commission line CL from the slave device of index k+1 to the slave device of index k+2. The master device MD can then store device information of the slave device of index k+1 in the information table.

The master device MD continues the enrollment process for each slave device and stops the enrollment process once it does not receive acknowledgement for a defined address from a slave device.

The slave devices set local field bus address to define a preset value, like the hexadecimal value "FF" and set the signal low in the commission line CL at start-up. Only a slave device, which has default field bus address and detects commissioning signal on the commission line CL, can accept an address commissioning frame.

Once enrollment process is over, the master device MD keeps device information in the table. At next start-up, the addresses are lost and the master device MD will need to send again instructions for address configuration to the slave devices.

In one embodiment, the address configuration frame from the master device MD contains a unique address and the identifier of the slave device of index k to change the common default address of the slave device of index k. These instructions are intended to the slave device of index k (the other slave devices ignore the frame because the identifier doesn't match). The unique address can have the same format as the common default address (a digit and two letters for example) and may code the index k of the slave device 101.k. For example, the address of the first slave device of index 1 can be 0XAA or 0X01 for example. The unique address of index k can be included in a payload of the command.

At a next start-up, if there is a faulty slave device, the master won't receive the acknowledgement of the address configuration frame from that faulty slave device. Then the master device can detect location and identifier of the faulty slave device to support an easy and fast troubleshooting, but also to keep the communication system running with the normal slave devices left, that continue to operate properly.

The master device MD is also able to detect a new slave module connected to the communication system, for example added to the stack formed by the slave devices. Once the new slave device is hot plugged into the communication system, the master device MD may start again an enrollment process by broadcasting on the field bus line FBL a command for enabling the commission line CL. Each slave device of index k, previously enrolled, is then ready to send a commissioning signal on the commission line CL to the next slave device of index k+1.

Wherever the new slave device has been placed, it will receive a commissioning signal on the commission line CL from a slave device having received the broadcast command and being connected to the new slave device via the commission line CL.

The new slave module is then enrolled as described previously by receiving, via the field bus line from the master device, instructions for address configuration with new default address of the slave device, a request for device information from the master device, and a command for enabling the commission line with the next slave device. The master device MD can then store device information of the new slave device in the information table.

Each slave module has its own configuration data relating to the operation of the slave device. For example, the slave device is associated with specific sensors and the configuration data define the configuration of the slave device to communicate with the specific sensors.

For a slave device, the configuration data can be saved in correspondence with the device information in the information table of the master device MD, as configuration data associated with the type of slave device and with the address of slave device. New configuration data or modification of the configuration data can be provided by the master device or the slave device.

At start-up, the master device addresses all the modules to synchronize configuration data of the slave devices. It compares the signature (for example via a checksum) of the configuration data stored in the slave device with the signature of the local configuration data. If the signatures are different, the master device issues synchronization of the configuration data with the slave module.

If a new slave device replaces a faulty slave device, the master device can automatically detect the new slave device with the help of device information in the information table and can start again an enrollment process. Additionally, the master device can restore the configuration data for the new slave device with the help of the backup configuration data.

An embodiment comprises a master device MD under the form of an apparatus comprising one or more processor(s), I/O interface(s), network interfaces, and a memory coupled to the processor(s). The processor(s) may be implemented as one or more microprocessors, microcomputers, microcontrollers, digital signal processors, central processing units, state machines, logic circuitries, and/or any devices that manipulate signals based on operational instructions. The processor(s) can be a single processing unit or a number of units, all of which could also include multiple computing units. Among other capabilities, the processor(s) are configured to fetch and execute computer-readable instructions stored in the memory.

The functions realized by the processor may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

The memory may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory includes modules and data. The modules include routines, programs, objects, components, data structures, etc., which perform particular tasks or implement particular abstract data types. The data, amongst other things, serves as a repository for storing data processed, received, and generated by one or more of the modules.

A person skilled in the art will readily recognize that steps of the methods, presented above, can be performed by programmed computers. Herein, some embodiments are also intended to cover program storage devices, for example, digital data storage media, which are machine or computer readable and encode machine-executable or computer-executable programs of instructions, where said instructions perform some or all of the steps of the described method. The program storage devices may be, for example, digital memories, magnetic storage media, such as a magnetic disks and magnetic tapes, hard drives, or optically readable digital data storage media.

Figure 2:
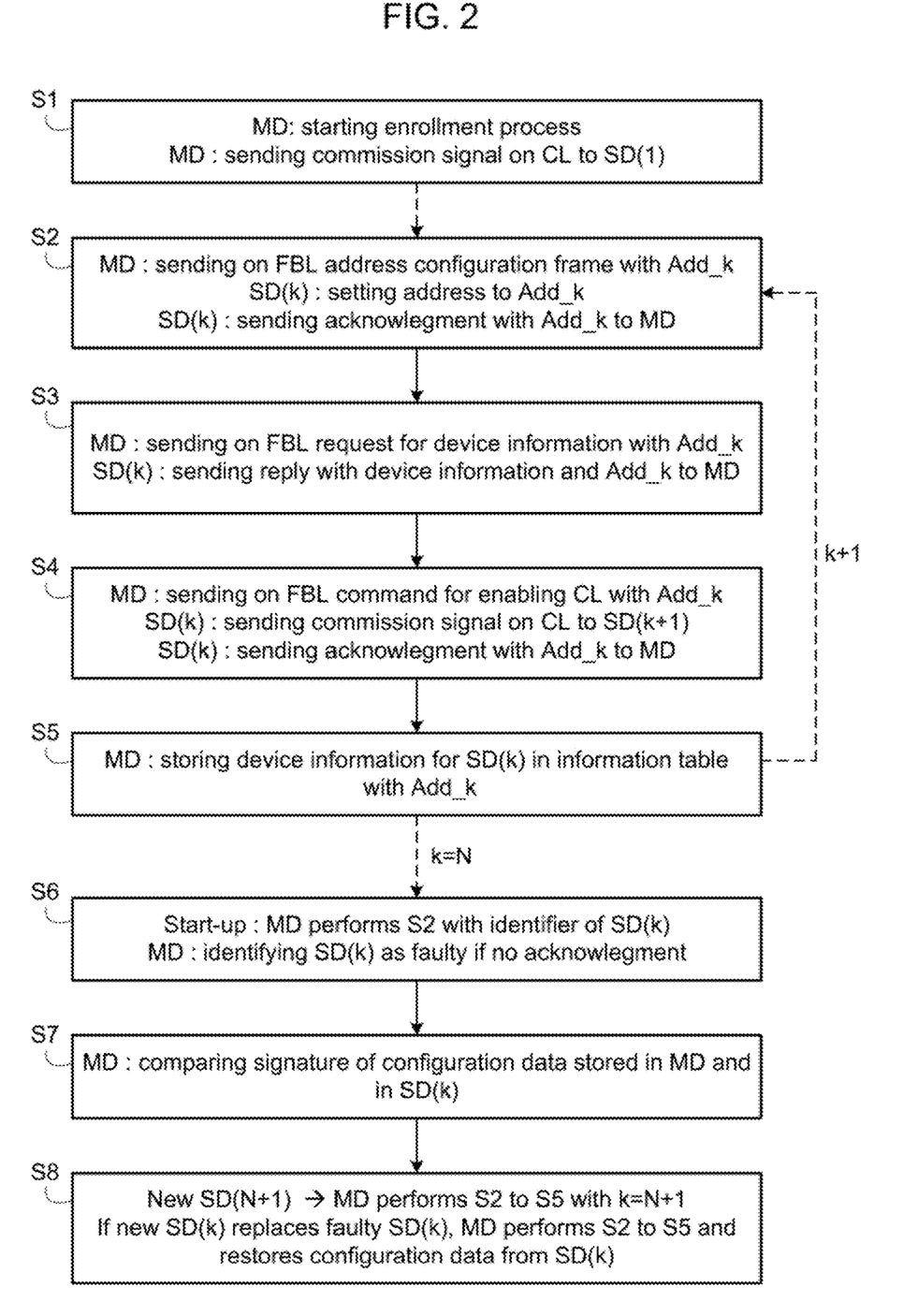
FIG. 2 shows a flow chart illustrating a method for configuring slave devices in an industrial network system according to one embodiment of the invention.

With reference to FIG. 2, a method for configuring slave devices in a communication system according to one embodiment of the invention comprises steps S1 to S8.

In initial step S1, the master device MD starts an enrollment process for all the slave devices and sends a commissioning signal on the commission line CL. The commissioning signal is sent to the first slave device connected to the master device, i.e. the slave device SD of index 1.

In step S2, the master device MD starts an enrollment process for the slave device of index k and sends an address configuration frame in broadcast on the field bus line FBL. The address configuration frame contains instructions for address configuration with a defined address Add k for the slave device of index k. The instructions command the slave device of index k to change the common default address of the slave device of index k to a unique address Add_k of index k.

All the slave devices receive the address configuration frame but only the slave device having received a commissioning signal on the commission line CL from the previous slave device (or the master device if the slave device has index 1) connected to it is able to accept the address configuration frame, the other slave devices will ignore or reject the address configuration frame.

As the slave devices are connected in chain via the commission line CL, the master device MD performs an enrollment process for each slave device in chain, by increasing the index k for the address configuration frame containing a defined address Add_k.

The slave device of index k, if it has received a commissioning signal on the commission line CL from the slave device of index k−1 or from the master device if k=1, accepts the address configuration frame containing a defined address Add_k and sets the local address for the field bus line FBL to Add_k.

Once the local address set, the slave device of index k sends an acknowledgement frame to the master device via the field bus line FBL, the acknowledgement frame containing the defined address Add_k.

In step S3, the master device MD sends a request for device information in broadcast on the field bus line FBL, the request containing the defined address Add_k.

The slave device of index k having acknowledged the previous address configuration frame, retrieves device information in a memory, the device information containing a name of the slave device of index k, an identifier of the slave device of index k and a type of the slave device of index k.

The slave device of index k sends a reply to the master device on the field bus line FBL, the reply containing the device information and the defined address Add_k.

In step S4, the master device MD sends a command in broadcast on the field bus line FBL, the command containing the defined address Add_k and instructions for enabling the commission line CL from the slave device of index k to the slave device of index k+1.

The slave device of index k sends a commissioning signal on the commission line CL to the next slave device of index k+1. Once the commissioning signal sent, the slave device of index k sends an acknowledgement frame to the master device, the acknowledgement frame containing the defined address Add_k.

In step S5, the master device MD stores device information of the slave device of index k in the information table, in correspondence with the defined address Add_k of index k.

Step S2 to S5 are iterated for an increasing index k to number N, N representing the number of slave devices in the communication system. N is not known in advance by the master device and is only determined once the enrollment process is terminated.

The enrollment process is terminated when the master device does not receive an acknowledgement frame containing a defined address Add_k from a slave device (as in step S2).

In step S6, a start-up of the communication system occurs and the master device MD sends iteratively instructions for address configuration to the slave devices, as in step S2 repeatedly. This time, the address configuration frame further contains identifier of the slave device of index k that was saved in correspondence with the defined address Add_k of index k.

The slave device of index k accepts the address configuration frame containing the identifier of the slave device of index k, by comparing the received identifier with an identifier stored in a local memory.

If the master device does not receive an acknowledgement frame containing a defined address Add_k after a defined time, the mater device identifies the slave device of index k as a faulty device. For example, a warning is shown in a HMI (Human-Machine Interface) of the master device.

In step S7, that can be executed iteratively for each slave device or once step S6 is over, i.e. all slave devices have been addressed, the master device compares, for each slave device, a signature of the configuration data stored in the slave device with the signature of the configuration data stored in the master device. If the signatures are different, the master device issues synchronization of the configuration data with the slave device.

In step S8, a new slave device is placed in the communication system during run time and is connected to the last slave device of index k, with k equal to N, in the chain via the commission line. The master device MD starts an enrollment process by broadcasting on the field bus line FBL a command for enabling the commission line CL. Each slave device of index k, previously enrolled, is then ready to send a commissioning signal on the commission line CL to the next slave device of index k+1. Thus, the slave device previously connected to the new slave device in the chain is able to send a commissioning signal on the commission line CL to the new slave device.

Then steps S2 to S5 are performed by the master device, to send instructions for address configuration with new defined address, a defined address Add_N+1 of index N+1 for the new slave device, a request for device information and a command for enabling the commission line with the next slave device. The master device MD can then store device information of the new slave device in the information table.

If the new slave device in the communication system replaces a faulty slave device, an operator triggers a replacement enrollment in the master device MD that performs again the steps S2 to S5.

The master device detects in step S3 that a new slave device has replaced the faulty slave device, by means of the retrieved device information. More especially, the master device detects that the identifier of the slave device has changed for the address corresponding to the faulty slave device.

Assuming the new slave device and the faulty slave device are of the same type, the master device can restore the configuration data for the new slave device with the help of the backup configuration data corresponding to the faulty device.

Optionally, the master device can ask for configuration restore permission to an operator and performs the configuration restore once permission is given.

Although the present invention has been described above with reference to specific embodiments, it is not intended to be limited to the specific form set forth herein. Rather, the invention is limited only by the accompanying claims and, other embodiments than the specific above are equally possible within the scope of these appended claims.

Furthermore, although exemplary embodiments have been described above in some exemplary combination of components and/or functions, it should be appreciated that, alternative embodiments may be provided by different combinations of members and/or functions without departing from the scope of the present disclosure. In addition, it is specifically contemplated that a particular feature described, either individually or as part of an embodiment, can be combined with other individually described features, or parts of other embodiments

The invention claimed is:

1. A method for configuring slave devices in a communication system comprising a master device and slave devices, wherein the master device and the slave devices are connected in chain via a commission line and in parallel via a field bus line, wherein each slave device is indexed by an index greater than or equal to 1, the slave device of index 1 being connected to the master device, wherein, to enroll the slave device of index k, k being equal to or greater than 1, the method comprises the following operations performed by the master device:

sending, in broadcast via the field bus line, an address configuration frame containing instructions for address configuration with a defined address of index k for the slave device of index k, sending, in broadcast via the field bus line, a request for device information, the request containing the defined address, sending, in broadcast via the field bus line after having received a reply containing device information and the defined address, a command for sending a commissioning signal via the commission line to the slave device of index k+1, the command containing the defined address, storing the received device information in an information table, the device information containing an identifier of the slave device of index k and a type of the slave device of index k, wherein the slave devices have a common default address before being enrolled and only a slave device of index k, which has the common default address and detects a commissioning signal on the commission line, accepts the address configuration frame to change the common default address of the slave device of index k to the defined address, wherein when a new slave device replaces a faulty slave device, a replacement enrollment is triggered in the master device that performs the sending an address configuration frame, sending a request for device information, sending a command and storing the received device information, and wherein the master device detects that a new slave device has replaced the faulty slave device, by means of the information table, the identifier of the new slave device and the identifier of the faulty slave device.

2. The method according to claim 1, wherein to enroll the slave device of index 1, the master device sends a commissioning signal on the commission line to the slave device of index 1 before sending, in broadcast via the field bus line, an address configuration frame.

3. The method according to claim 1, wherein the master device receives an acknowledgement frame, the acknowledgement frame containing the defined address before sending, a request for device information, the request containing the defined address.

4. The method according to claim 3, wherein the enrollment of slave devices is terminated when the master device does not receive an acknowledgement frame containing a defined address from a slave device.

5. The method according to claim 1, wherein a start-up of the communication system to address the slave device of index k, the master device sends, in broadcast via the field bus line, an address configuration frame containing instructions for address configuration with the defined address of index k and the identifier of the slave device of index k.

6. The method according to claim 5, wherein a start-up of the communication system, the slave devices have a common default address, and the slave device of index k receiving the address configuration frame accepts the address configuration frame to change the common default address of the slave device of index k to the defined address.

7. The method according to claim 6, wherein the master device identifies a slave device of index k as a faulty device if the master device does not receive an acknowledgement frame containing the defined address after having sent the address configuration frame containing instructions for address configuration with the defined address of index k and the identifier of the slave device of index k.

8. The method according to claim 1, wherein the master device compares, for each slave device, a signature of configuration data stored in the slave device with a signature of configuration data stored in the master device, in order to synchronize the configuration data stored in the slave device with the configuration data stored in the master device if the signatures are different.

9. The method according to claim 1, wherein when a new slave device of index n+1 is placed in the communication system during run time, wherein the new slave device is connected to the last slave device of index k, with k equal to n, of the communication system, the master device starts an enrollment process by sending, in broadcast on the field bus line, a command for enabling the commission line in order that each slave device of index k, previously enrolled, sends a commissioning signal on the commission line to the next slave device of index k+1, and the master device performs the sending an address configuration frame with defined address of index n+1, sending a request for device information with defined address of index n+1, sending a command with defined address of index n+1 and storing the received device information.

10. The method according to claim 1, wherein the master device compares, for each slave device, a signature of configuration data stored in the slave device with a signature of configuration data stored in the master device, in order to synchronize the configuration data stored in the slave device with the configuration data stored in the master device if the signatures are different, and wherein when a new slave device replaces a faulty slave device, for which configuration data are stored in the master device in correspondence with an identifier of the faulty slave device and a type of the faulty slave device, the master device restores the configuration data for the new slave device by means of the configuration data of the faulty device, if the new slave device and the faulty slave device are of the same type.

11. A master device for configuring slave devices in a communication system comprising the master device and slave devices, wherein the master device and the slave devices are connected in chain via a commission line and in parallel via a field bus line, wherein each slave device is indexed by an index greater than or equal to 1, the slave device of index 1 being connected to the master device, wherein, to enroll the slave device of index k, k being equal to or greater than 1, the master device comprising:

one or more network interfaces to communicate with the slave devices;

a processor coupled to the network interfaces and configured to execute one or more processes; and a memory configured to store a process executable by the processor, the process when executed operable to:

send, in broadcast via the field bus line, an address configuration frame containing instructions for address configuration with a defined address of index k for the slave device of index k, send, in broadcast via the field bus line, a request for device information, the request containing the defined address, send, in broadcast via the field bus line after having received a reply containing device information and the defined address, a command for sending a commissioning signal via the commission line to the slave device of index k+1, the command containing the defined address, store the received device information in an information table, the device information containing an identifier of the slave device of index k and a type of the slave device of index k, wherein the slave devices have a common default address before being enrolled and only a slave device of index k, which has the common default address and detects a commissioning signal on the commission line, accepts the address configuration frame to change the common default address of the slave device of index k to the defined address, wherein when a new slave device replaces a faulty slave device, a replacement enrollment is triggered in the master device that performs the sending an address configuration frame, sending a request for device information, sending a command and storing the received device information, and wherein the master device detects that a new slave device has replaced the faulty slave device, by means of the information table, the identifier of the new slave device and the identifier of the faulty slave device.

12. A non-transitory computer readable storage medium, with a computer program stored thereon, said computer program comprising instructions for, when executed by a processor, carrying out the method according to claim 1.

13. A system comprising the master device according to claim 11 and a plurality of slave devices connected in chain to the master device.

* * * * *